No. 767,377. PATENTED AUG. 16, 1904.
R. H. BOWEN.
SHEAVE, WHEEL, OR PULLEY.
APPLICATION FILED MAY 14, 1904.
NO MODEL. 2 SHEETS—SHEET 1.
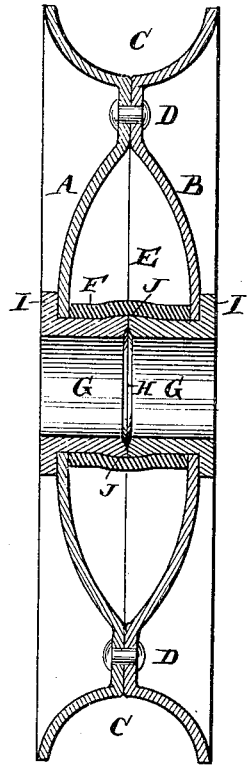
FIG. 1
FIG. 2
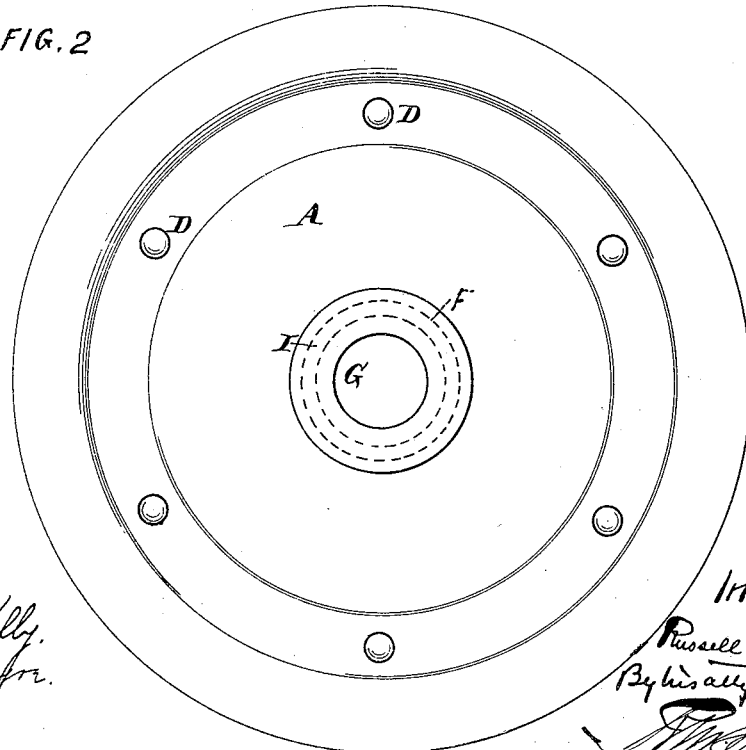
Attest
R. M. Kelly
M. J. Eyre
Inventor
Russell H. Bowen
By his atty No. 767,377. Patented August 16, 1904.

UNITED STATES PATENT OFFICE.

RUSSELL H. BOWEN, OF PALMYRA, NEW JERSEY, ASSIGNOR TO THE AMERICAN PULLEY COMPANY, A CORPORATION OF PENNSYLVANIA.

SHEAVE, WHEEL, OR PULLEY.

SPECIFICATION forming part of Letters Patent No. 767,377, dated August 16, 1904.

Application filed May 14, 1904. Serial No. 207,943. (No model.)

*To all whom it may concern:*

Be it known that I, RUSSELL H. BOWEN, of Palmyra, Burlington county, State of New Jersey, have invented an Improvement in Sheaves, Wheels, or Pulleys, of which the following is a specification.

My invention has reference to sheaves, wheels, and pulleys; and it consists of certain improvements which are fully set forth in the following specification, and shown in the accompanying drawings, which form a part thereof.

The object of my invention is to provide a simple, durable, and inexpensive construction of sheaves, wheels, and pulleys especially adapted to small sizes.

In carrying out my invention I form the sheave, wheel, or pulley of sheet metal in two halves stamped into the requisite form and secured together at or near the rim and inclosing at the hub a tubular sleeve, and combined therewith I employ two flanged bushings which clamp the sheet-metal halves to the sleeve and abut within the sleeve in such manner as to spread outward to form an expanded or enlarged annular portion fitting into an internal annular groove or recess in the interior of the sleeve, formed in the act of forcing the bushings into place or in a previously-prepared sleeve.

My invention also comprehends details of construction which, together with the above features, will be better understood by reference to the drawings, in which—

Figure 3:
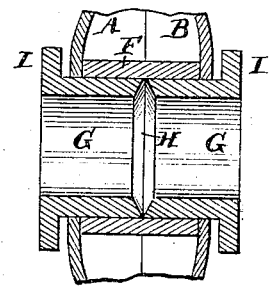
Figure 4:
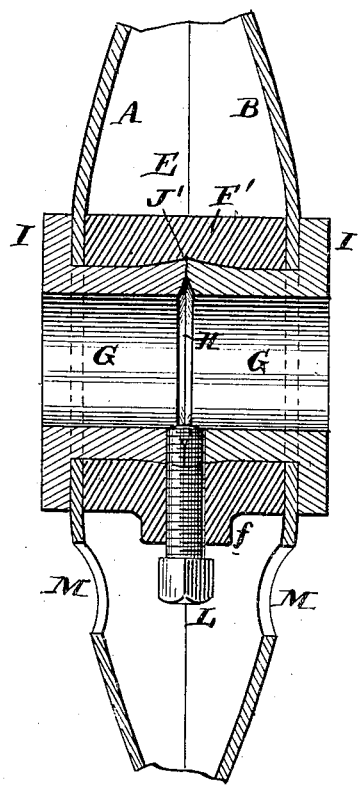
Figure 5:
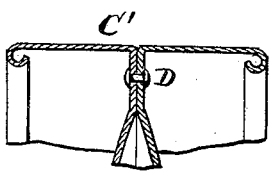

Figure 1 is a sectional elevation of a sheave embodying my invention. Fig. 2 is a side elevation of same. Fig. 3 is a sectional elevation of a modification of same at the hub portion. Fig. 4 is a sectional view of another modification, and Fig. 5 is a cross-section showing a form of rim suitable for a band-pulley.

A and B are the halves of the sheave and are stamped out of sheet-steel of the shape and size desired. They are placed face to face and secured near the rim by rivets D or other suitable means. The rim is flanged to form the groove C, Fig. 1, or the flat rim C', Fig. 5, as may be required. The central portions of the halves A B are cupped, so as to spread apart, as at E, and receive between them the sleeve F, which constitutes a spacing-piece. This sleeve is placed in position before the halves are put together, as the holes are not sufficiently large to introduce the sleeve after the uniting of the parts A and B. The parts A and B are firmly clamped against the ends of the sleeve F by the flanges I of the bushings G. There are two of these bushings G, and they are inserted, as shown in Fig. 3, with their beveled ends H meeting. They are then driven together until the flanges I clamp the plates A B. When this is done, the inner beveled ends H will have been expanded or upset, producing an enlarged rim at the juncture of the two bushings, as indicated in Fig. 1. The formation of this expanded portion causes the sleeve F to be pressed outward in an angular groove J, and this is of course fitted by the expanded ends H of the bushings G. To insure this grooving of the sleeve F, I prefer to make it of somewhat thinner metal than that employed in the bushings, so that it will spread under the expanding pressure exerted. When these bushings G are forced into place, the tool employed supports them upon mandrels or studs, so that they cannot possibly bend inwardly. Consequently they must expand outwardly. The beveling of the ends greatly facilitates this outward upsetting.

The sleeve F and the bushings G G when secured in place in the manner above described constitute the hub of the pulley or sheave.

In place of using a steel sleeve F, I may employ a cast-metal sleeve, as shown at F' in Fig. 4. In this case the groove is positively formed upon the inside, as indicated at J'. When cast metal is employed, the sleeve may be very thick, and hence give a considerable support for each side of the parts A and B. Furthermore, this sleeve may be cast with a boss *f* and hold a set-screw L, which may be adjusted through an aperture M in the parts A or B, or either of them, as shown in Fig. 4. In this case the upsetting of the end of the bushings has no duty to perform on the sleeve, and hence would require somewhat less power than required in the case of the construction of Fig. 1.

While I prefer the construction shown, I do not confine myself to the details, as these may be modified without departing from the spirit of my invention.

Having now described my invention, what I claim as new, and desire to secure by Letters Patent, is—

1. In a sheave, wheel or pulley, the combination of sheet-metal halves, combined with a hub consisting of a sleeve interposed between the two metal halves, and two flanged bushings fitting within the sleeve and butted and having their flanges extending over the outside surface of the halves and their butted ends expanded to a larger diameter than the rest of the bushings within the sleeve.

2. In a sheave, wheel or pulley, the combination of sheet-metal halves, combined with a hub consisting of a sleeve interposed between the metal halves and having an annular groove upon its inner surface between the ends, and two flanged bushings fitting within the sleeve and butted and having their flanges extending over the outside surface of the halves and their butted ends expanded to a larger diameter than the rest of the bushings within the sleeve and fitting outward into the annular groove in the sleeve.

3. In a sheave, wheel or pulley, the combination of sheet-metal halves so shaped that when united they form a grooved rim C and an annular space E at the center, combined with a hub consisting of a sleeve interposed between the metal halves, and two flanged bushings fitting within the sleeve and butted and having their flanges extending over the outside surface of the halves and their butted ends expanded to a larger diameter than the rest of the bushings within the sleeve.

4. In a sheave, wheel or pulley, the combination of sheet-metal halves combined with a hub consisting of a thick sleeve interposed between the metal halves and having an annular groove upon its inner surface between the ends, and two flanged bushings fitting within the sleeve and butted and having their flanges extending over the outside surface of the halves and their butted ends expanded to a larger diameter than the rest of the bushings within the sleeve and fitting outward into the annular groove in the sleeve, and a set-screw carried by the sleeve and extending through the bushings.

5. A sheave, wheel or pulley having sheet-metal halves, combined with a hub consisting of tubular parts having shoulders for holding the sheet-metal halves and fitted within each other and in which the inner tubular part is of larger diameter than the smallest diameter of the outer tubular part to hold them together and in clamping position upon the said sheet-metal halves.

6. In a sheave, wheel or pulley, the combination of sheet-metal halves, combined with a hub consisting of a sleeve interposed between the metal halves and having an internal recess or groove, and two bushings fitting within the sleeve and butted and said butted ends expanded to larger diameter than the rest of the bushing within the sleeve and fitting outward into the recess or groove of the sleeve.

7. The combination of two cylindrical parts butted together end to end and each having their abutting ends of slightly-larger circumferential size than the adjacent portions, with an inclosing sleeve tightly surrounding said cylindrical parts at and adjacent to their abutted ends and having an annular internal recess to receive the enlarged ends, whereby the several parts are rigidly and positively united.

8. The combination of two tubular parts butted together end to end and each having their abutting ends of slightly-larger diameter than the adjacent portions, with an inclosing sleeve tightly surrounding said tubular parts at and adjacent to their abutted ends and having an annular internal recess to receive the enlarged ends, whereby the several parts are rigidly and positively united.

In testimony of which invention I hereunto set my hand.

RUSSELL H. BOWEN.

Witnesses:
JOHN WEST MANOGUE,
JOSEPH ENTWISLE.